(12) United States Patent
Darroman

(10) Patent No.: US 7,535,207 B2
(45) Date of Patent: May 19, 2009

(54) TAPPED CONVERTER

(75) Inventor: Yann Darroman, Torello (ES)

(73) Assignee: Lear Corporation, Southfield, MI (US)

( * ) Notice: Subject to any disclaimer, the term of this patent is extended or adjusted under 35 U.S.C. 154(b) by 307 days.

(21) Appl. No.: 11/533,995

(22) Filed: Sep. 21, 2006

(65) Prior Publication Data

US 2008/0074090 A1 Mar. 27, 2008

(51) Int. Cl.
*G05F 1/14* (2006.01)
(52) U.S. Cl. .......................... 323/255; 323/247
(58) Field of Classification Search ................ 323/247, 323/255, 259, 267
See application file for complete search history.

(56) References Cited

U.S. PATENT DOCUMENTS

| | | | |
|---|---|---|---|
| 4,184,197 A | | 1/1980 | Cuk et al. |
| 4,853,668 A | * | 8/1989 | Bloom ................. 336/214 |
| 4,864,478 A | * | 9/1989 | Bloom ................. 363/16 |
| 4,975,820 A | | 12/1990 | Szepesi |
| 6,429,629 B1 | * | 8/2002 | Nguyen ................. 323/255 |
| 6,486,642 B1 | * | 11/2002 | Qian ................. 323/259 |
| 6,876,556 B2 | | 4/2005 | Zhu et al. |
| 6,909,201 B2 | | 6/2005 | Murty et al. |
| 7,117,044 B2 | * | 10/2006 | Kocher et al. ........... 700/34 |
| 2004/0037100 A1 | | 2/2004 | Orr et al. |
| 2005/0162018 A1 | | 7/2005 | Realmuto et al. |
| 2006/0092588 A1 | | 5/2006 | Realmuto et al. |

FOREIGN PATENT DOCUMENTS

EP 0 516 377 A2 12/1992

OTHER PUBLICATIONS

G. Spiazzi, S. Buso, Power Factor Preregulator Based on Modified Taped-Inductor Buck Converter, Department of Electronics and Informatics University of Padova, 6 pages.

* cited by examiner

*Primary Examiner*—Emily Pham
(74) *Attorney, Agent, or Firm*—Brooks Kushman P.C.

(57) ABSTRACT

A converter having a tapped inductor to facilitate controlling operating characteristics of the converter. The converter may be configured as a boost converter with tapping of the inductor at the voltage output and the converter may be configured as a buck converter with tapping of the inductor at the voltage input. The converter may also be configured as a bi-direction dual voltage converter having capabilities to switch between boost and buck modes.

10 Claims, 2 Drawing Sheets

TAPPED CONVERTER

BACKGROUND OF THE INVENTION

1. Field of the Invention

The present invention relates to converters having tapped inductors.

2. Background Art

For the basic buck, boost and buck-boost converters in the continuous conduction mode the conversion ratio $V_{out}/V_{in}$ is always related to the duty cycle $\delta$ of the transistor switch, which is controlled by pulse width modulation (PWM). In practice, minimum and maximum conversion ratios are limited.

The classical boost converter for instance, is very efficient when not too large a potential difference separates the output voltage from the input voltage (i.e. when the duty cycle $\delta$ is low, and typically below 50%). However, in industrial applications, it is not unusual that a 14V input voltage needs stepping up to 220V (and even higher) for the supply of household facilities. When such a conversion ratio is required, the duty cycle $\delta$ must be very high to achieve such a transfer ratio and the efficiency of the classical boost converter becomes unacceptably low. This leads to poor utilization of passive components and poor current waveform form factors. In the classical boost and buck-boost converters, efficiency worsens significantly for a duty cycle $\delta$ over 50%.

The classical buck converter for instance, is very efficient when not too large a potential difference separates the output voltage from the input voltage (i.e. when the duty cycle $\delta$ is high, and typically over 50%). However, in industrial applications, it is not unusual that a 48V input voltage needs stepping down to 3.3V (and even below) for the supply of semiconductors or microprocessors. When such a conversion ratio is required, the duty cycle $\delta$ must be very low to achieve such a transfer ratio and the efficiency of the classical buck converter becomes unacceptably low. This leads to poor utilization of passive components and poor current waveform form factors.

The efficiency of the dc-dc converter when a large conversion ratio is required needs therefore to be improved. The conversion ratio can be extended significantly by cascading two dc-dc converter. However, such applications require twice as many components as a basic converters, which is very costly and difficult to manage.

A high voltage ratio may be obtained using quadratic converters. These converters have the same conversion ratio as two cascaded boost dc-dc converters, with only one transistor switch. They are called quadratic converters because they square the standard dc-dc converter voltage ratios. This leads to easier control and management of the converter. Moreover, compared to a classical converter, quadratic converters yield a much lower limit on the minimum attainable conversion ratio.

In terms of efficiency and cost, a single-stage converter is a better choice than a two-stage converter since single-stage converters employ fewer components than two-stage converters. Hence the applications of the quadratic converters are only tolerable where conventional, single stage converters are inadequate—in particular for high frequency applications where the specified range of input voltages and the specified range of output voltages call for an extremely large range of conversion ratios. Another drawback is that even though these converters utilize a single transistor switch, the number of components is still higher than in basic converters.

Synchronous rectification may be used to improve the efficiency of a converter. Significant efficiency improvement can be made in the case of a dc-dc converter. The technique employed is to substitute the diode with an N-channel MOSFET. Both transistor switches are controlled by two signals $v_1$ and $v_2$ one of which is the inverse of the other. The goal of this change is to reduce the forward-biased voltage of the classical diode i.e. 0.6V. For a Schottky diode, the diode drop will be lower than 0.6V (typically 0.3V). However, by employing the synchronous rectifier technique, the drop will depend on semiconductor technology and can be reduce to 0.1V or even below.

The improvement is achieved for duty cycles below 50% for boost topologies and above 50% for buck topologies but not over that value. High duty for boost topologies and low duty cycles for buck topologies causes losses in the inductor as well as larger inductor ripple currents, which increase conduction losses and switching losses in the MOSFETs. Another problem for the synchronous rectifier boost converter working at high duty cycle (>50%) and a synchronous rectifier buck converter working at low duty cycle (<50%), is the asymmetric transient response that occurs due to the great difference between the rate of rise and the rate of fall of the inductor current.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

One non-limiting aspect of the present invention relates to the user of tapped inductors with the traditional buck and boost converters and extending the benefits thereof to provide a bi-directional dual voltage 14V/42V DC/DC converter that may be particularly advantageous for automotive applications wherein it may desirable to converter DC voltages between 14V and 42V, or according to another similarly fixed or variable voltage.

Figure 1:
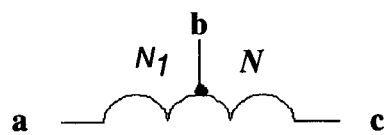
FIG. 1 illustrates at tapped inductor in accordance with one non-limiting aspect of the present invention.

FIG. 1 illustrates at tapped inductor in accordance with one non-limiting aspect of the present invention. The tapped inductor may be advantageous in extending the duty cycle range in classical dc-dc converters and obtaining a wide conversion ratio. One advantage of a tapped-inductor arrangement is that it only involves a slight modification of the original converters. Tapping the inductor has the benefit that the duty cycle of the converter at the operating point can be adjusted to a desirable value—typically a value at which the device utilization is improved.

This brings significant advantages compared to the quadratic converters in which the conversion voltage ratio only depends on the duty cycle. The tapping of the inductor also permits a different mix of voltage and current ratings for the various elements of the circuit, and particularly for the transistor switch and diode. These components arranged in a different manner allow different kinds of dc-dc converters to be derived.

For each circuit the conversion ratio $V_{out}/V_{in}$ in continuous conduction mode may be expressed in terms of the duty cycle $\delta$ and a constant K. The winding ratio K of the tapped coil is a function of the location of the tap (terminal b in FIG. 1) and is here defined as:

$$K = \frac{N_1}{N_1 + N_2}$$

where $N_1$ and $N_2$ are the number of coil turns either side of the tap. Optionally, the characteristics of the three standard dc-dc converters may be obtained if K=1

Figure 2:
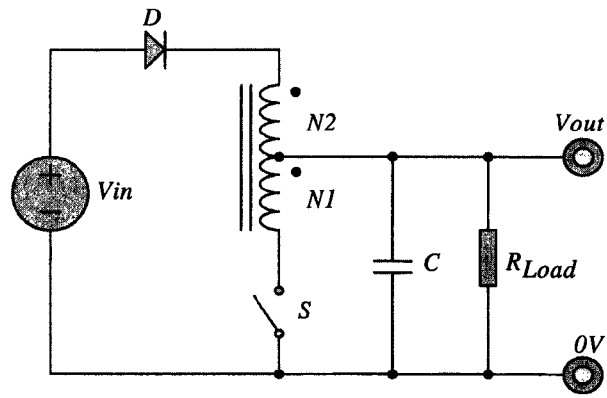
FIG. 2 illustrates an output-to-tap boost converter in accordance with one non-limiting aspect of the present invention.

FIG. 2 illustrates an output-to-tap boost converter in accordance with one non-limiting aspect of the present invention. The converter may include voltage source (Vin), a tapped inductor (L), a switch (S), a diode (D), a capacitor (C), and a voltage output (Vout) associated with a load (Rload).

In this tapped-inductor boost converter, the traditional converter topology of the boost is effectively extended by an additional inductor in series with the diode that is magnetically coupled with the original inductor. To achieve the magnetic coupling, both windings are on the same core and therefore no additional magnetic core is required. The use of a tapped inductor converter leads to high step-up ratio thus avoiding the extreme duty cycle and high peak currents which the active switch and diode would otherwise experience.

In the output-to-tap boost converter, the diode and switch are swapped, leading to another topology in the boost converter field. The transfer ratio in CCM, DCM, $M_{crit}$ and $D_{off}$ are presented below.

Following the method of flux conservation, the transfer ratio of the output-to-tap converter in continuous conduction mode can be shown to be:

$$\frac{V_{out}}{V_{in}} = \frac{K(1-\delta)}{K-\delta}$$

In the critical conduction mode, the current falls to zero at the end of the switching period. The expression of $M_{crit}$ for this converter is given by:

$$M_{crit} = \delta\left[(1-\delta)\frac{K}{1-K} - \delta\right]$$

In discontinuous conduction mode, a third state is introduced in which the current in the inductor falls to zero and the circuit is in the quiescent state. Introducing this third state into the calculations yields the result:

$$\frac{V_{out}}{V_{in}} = \frac{KD_{off}}{KD_{off} - \delta(1-K)}$$

where $D_{off}$ is a function of the load condition and is given by:

$$D_{off} = \frac{1-K}{K}\left(\frac{M}{\delta} - \delta\right)$$

Figure 3:
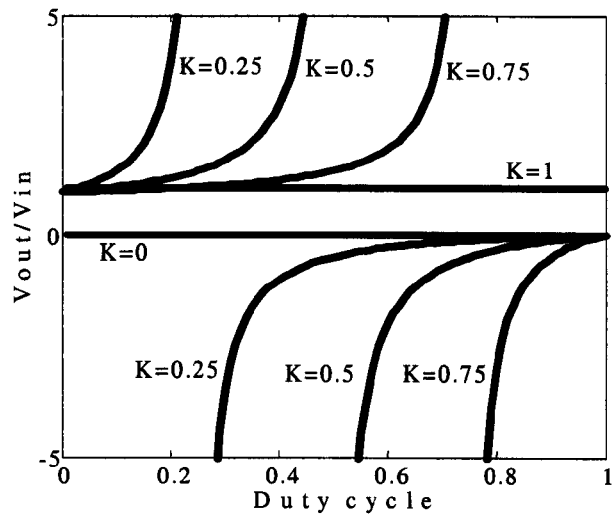
FIG. 3 illustrates the variation of $V_{out}/V_{in}$ with $\delta$ for the output-to-tap boost converter in accordance with one non-limiting aspect of the present invention.

The variation of $V_{out}/V_{in}$ with $\delta$ is illustrated for various values of K in equation FIG. 3. It can be seen that when $\delta<K$, the output-to-tap boost converter operates as a boost converter with a positive output voltage to a passive load. When $\delta>K$, the output-to-tap boost converter topology requires that the current still to be positive but the output voltage is negative, a situation which is only viable with an active load. Once more, with the classification scheme employed (continuous conduction and passive load) it is appropriate to assign this converter to the boost converter category.

An interesting characteristic of the output-to-tap boost converter is that the duty cycle at which the transfer ratio is extremely high is set by K. Indeed, if K=0.25 for instance, therefore the duty cycle at high the transfer ratio would be the highest will be 0.25, a relatively low duty cycle, increasing the efficiency of the system with relatively low component count.

Optionally, when the input voltage of the output-to-tap boost converter is ac, the output-to-tap boost converter can work as an ac/dc converter by adjusting the duty cycle at the value at which the reference voltage is achieved. As the output-to-tap boost converter integrates a tapped inductor, therefore the duty cycle can be adjusted to a value at which device utilization is improved. Hence, it is a compromise between the Power factor correction boost converter and Flyback converter usually used as ac/dc or Power Factor correction applications.

Figure 4:
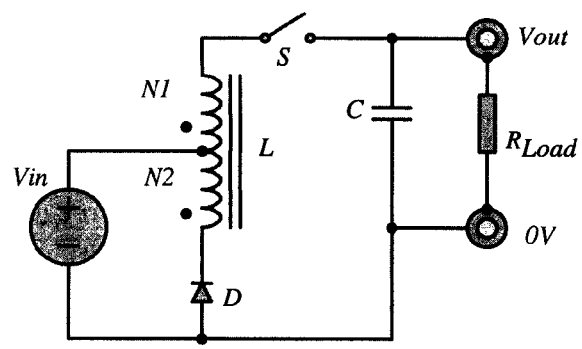
FIG. 4 illustrates an rail-to-tap buck converter in accordance with one non-limiting aspect of the present invention.

FIG. 4 illustrates an rail-to-tap buck converter in accordance with one non-limiting aspect of the present invention. The converter may include voltage source (Vin), a tapped inductor (L), a switch (S), a diode (D), a capacitor (C), and a voltage output (Vout) associated with a load (Rload). In this converter, the input rail is directly connected to the tapping point of the coil.

The transfer ratio of the Input to tap buck converter has been calculated for a centre-tap situation only yielding the result:

$$\frac{V_{out}}{V_{in}} = \frac{2\delta - 1}{\delta}$$

where $\delta$ as usual is the switch duty cycle. Using the principle that the flux in the tapped inductor core will be the same immediately before and immediately after switching the more general equation for the transfer ratio can be shown to be given by:

$$\frac{V_{out}}{V_{in}} = \frac{\delta - K}{\delta(1-K)}$$

The critical conduction mode will be reached for a value of $M_{crit}$ defined as:

$$M_{crit} = \frac{\delta^3(1-K)}{\delta - K})$$

The transfer ratio in discontinuous conduction mode and the expression of $D_{off}$ are given by:

$$\frac{V_{out}}{V_{in}} = \frac{(1-K)\delta - KD_{off}}{(1-K)\delta}$$

where $D_{off}$ is given by:

$$D_{off} = \delta \frac{1-K}{K}\left(1 - \frac{\delta^2}{M}\right)$$

Figure 5:
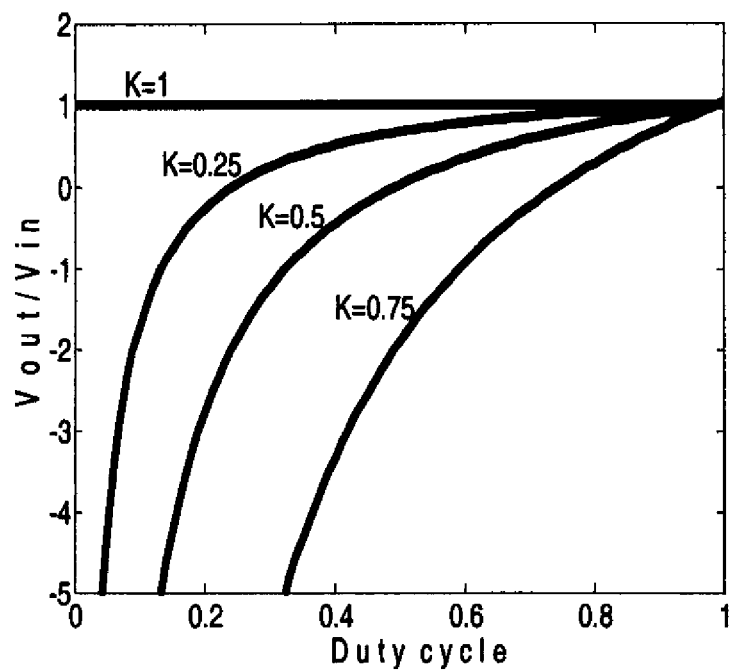
FIG. 5 illustrates the variation of $V_{out}/V_{in}$ with $\delta$ for the rail-to-tap buck converter in accordance with one non-limiting aspect of the present invention.

The variation of $V_{out}/V_{in}$ with $\delta$ for various values of K is shown in FIG. 5. It can be seen that when duty cycle is in the range $\delta>K$, the converter operates as a buck converter providing positive current with a positive output voltage to a passive load. When $\delta<K$ the circuit topology requires that the current is again positive but the output voltage is negative, a situation which is only viable with an active load. Again, this quadrant of operation is not particularly useful and may be discounted for basic classification purposes.

Figure 6:
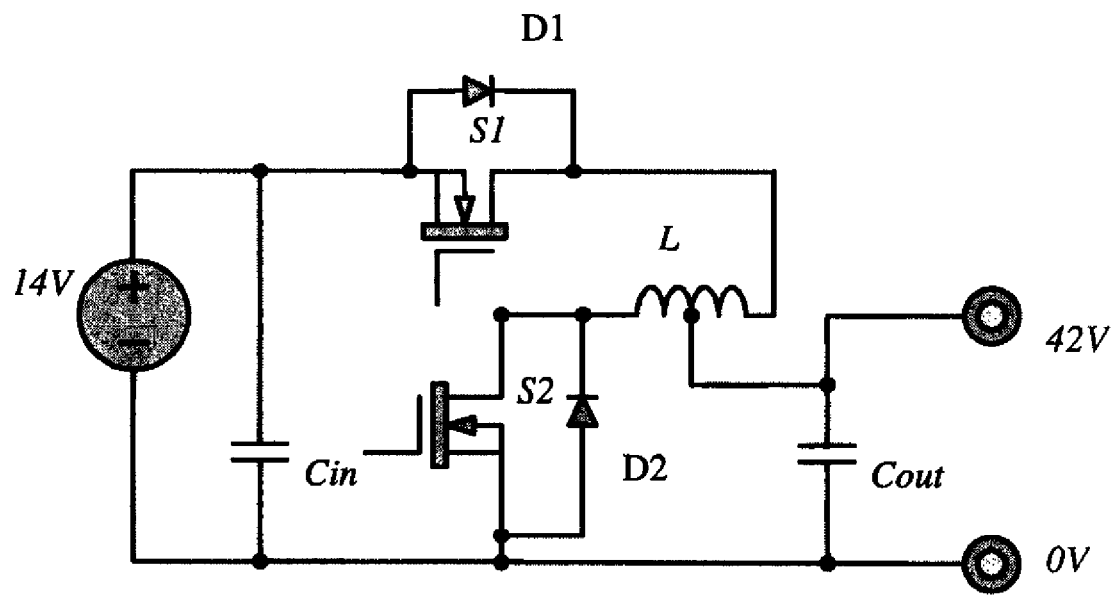
FIG. 6 illustrates a bi-directional dual voltage converter in accordance with one non-limiting aspect of the present invention.

FIG. 6 illustrates a bidirectional dual voltage (14V/42V) DC/DC converter in accordance with one non-limiting aspect of the present invention. The converter combines the above identified output-to-tap boost converter and rail-to-tap buck converter to leverage off of the benefits associated therewith. For exemplary purposes, and without intending to limit the scope and contemplation of the present invention, the converter is described with respect to an automotive application that utilizes bidirectional voltage conversion between 14 and 42 volts.

The converter may include voltage input (Vin, 14V), a tapped inductor (L), a first switch (S1), a second switch (S2), a first diode (D1), a second diode (D2), an input capacitor (Cin), an output capacitor (C2) and a voltage output (Vout, 42V). The converter employs tapped inductor instead of standard coil, permitting the duty cycle of the converter to be adjusted to a value at which the efficiency of the system is improved is to be used by different car and/truck makers.

In operation, the bi-direction converter may be used to step-up or step-down depending on operations of the switches S1 and S2. For step-up operations, the second switch S2 is always off and the duty cycle of the first switch S1 is regulated as described above with respect to the output-to-tap boost converter so as to boost voltage according the transfer ratio described above. For step-down operations, the first switch S1 is always off and the duty cycle of the second switch S2 is regulated as described above with respect to the rail-to-tap buck convert so as to buck voltage according to the transfer ratio described above.

The new bi-directional 14/42 dc/dc converter is aimed to improve the performance of the classical and already exciting dual voltage converter by only substituting the standard coil by the tapped inductor. Integrating the tapped inductor instead of a classical inductor permits the setting of the duty cycle of the main transistor switch (S1 for buck and S2 for boos) to a desirable value at which the efficiency of the system is improved.

Economically, the substitution of the standard coil by the tapped inductor implies a slight cost increase which can be defrayed by a higher efficiency and so less heat dissipation through the device. The duty cycle of the buck and boost converters can now be set to a desirable value at which the efficiency of the system is improved thanks to the insertion of the winding ratio of the tapped-inductor into the transfer ratio and less heat is produced due to higher efficiency.

One advantage of the present invention relates to optionally reducing cost, weight, size, complexity and energy losses associated with the use of transformers in high conversion ratio dc-dc converters that does so without transformers and avoids cascading several dc-dc converters.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

What is claimed:

1. A DC/DC converter having a voltage input, diode, switch, capacitor, and voltage output, the converter comprising:
    a tapped inductor connected to facilitate controlling a transfer ratio of the converter as a function of a tapping point of the inductor; and
    wherein the transfer ratio of the converter is given by the following in equation $$\frac{V_{out}}{V_{in}} = \frac{K(1-\delta)}{K-\delta}$$

wherein Vout corresponds with the voltage output, Vin corresponds with the voltage input, $\delta$ correspond with a duty cycle of the switch, and K corresponds with a tapping point of the inductor.

2. The converter of claim 1 wherein the voltage input, diode, switch, voltage output, and tapped inductor are configured to provide an output-to-tap boost converter.

3. The converter of claim 1 wherein the voltage input, diode, switch, voltage output, and tapped inductor are configured to provide a rail-to-tap buck converter.

4. The converter of claim 1 wherein K is given by the following equation:

$$K = \frac{N_1}{N_1 + N_2}$$

where $N_1$ and $N_2$ are the number of coil turns either side of the tapping point of the tapped inductor.

5. The converter of claim 1 further comprising an additional diode and switch wherein the voltage input, diodes, switches, voltage output, and tapped inductor are configured to provide a bi-directional dual voltage converter.

6. The converter of claim 5 wherein one of the two switches is opened and the duty cycle of the other switch is regulated to provide voltage boost and wherein the other of the two switches is opened and the duty cycle of the other switch is regulated to provide voltage buck.

7. A converter comprising:
    a voltage input, diode, switch, capacitor, voltage output, and a tapped inductor arranged in a boost configuration;
    wherein the voltage output is connected to tapping point of the inductor; and wherein the transfer ratio of the converter is given by the following in equation:

$$\frac{V_{out}}{V_{in}} = \frac{K(1-\delta)}{K-\delta}$$

wherein Vout corresponds with the voltage output, Vin corresponds with the voltage input, δ corresponds with a duty cycle of the switch, and K corresponds with a tapping point of the inductor.

8. The converter of claim 7 wherein K is given by the following equation:

$$K = \frac{N_1}{N_1 + N_2}$$

where $N_1$ and $N_2$ are the number of coil turns either side of the tapping point of the tapped inductor.

9. A converter comprising:
a voltage input, diode, switch, capacitor, voltage output, and a tapped inductor arranged in a buck configuration;

wherein the voltage input is connected to tapping point of the inductor; and
wherein the transfer ratio of the converter is given by the following in equation:

$$\frac{V_{out}}{V_{in}} = \frac{K(1-\delta)}{K-\delta}$$

wherein Vout corresponds with the voltage output, Vin corresponds with the voltage input, δ corresponds with a duty cycle of the switch, and K corresponds with a tapping point of the inductor.

10. The converter of claim 9 wherein K is given by the following equation:

$$K = \frac{N_1}{N_1 + N_2}$$

where $N_1$ and $N_2$ are the number of coil turns either side of the tapping point of the tapped inductor.

* * * * *